United States Patent [19]

Soults et al.

[11] Patent Number: 4,873,513
[45] Date of Patent: Oct. 10, 1989

[54] AUTOMATED MAP DISPLAY SYSTEM

[75] Inventors: Donald J. Soults, Vienna; Neil A. Daniels, Arlington, both of Va.

[73] Assignee: Geodisplay Technology Limited Partnership, Vienna, Va.

[21] Appl. No.: 89,450

[22] Filed: Aug. 26, 1987

[51] Int. Cl.$^4$ ............................................. G09G 1/00
[52] U.S. Cl. .................................. 340/723; 340/706; 340/990; 340/995
[58] Field of Search ............... 340/990, 995, 723, 724, 340/731, 706, 709; 364/443, 518, 521

[56] References Cited

U.S. PATENT DOCUMENTS

| | | | |
|---|---|---|---|
| 4,360,876 | 11/1982 | Girault et al. | 364/443 |
| 4,513,377 | 4/1985 | Hasebe et al. | 340/995 |
| 4,630,209 | 12/1986 | Saito et al. | 340/995 |
| 4,675,676 | 6/1987 | Takanabe et al. | 340/995 |
| 4,737,916 | 4/1988 | Ogawa et al. | 340/995 |

Primary Examiner—David K. Moore
Assistant Examiner—Jeffery A. Brier
Attorney, Agent, or Firm—Finnegan, Henderson, Farabow, Garrett & Dunner

[57] ABSTRACT

An automated map display system stores in an optical storage unit a plurality of map portion images generated from any assortment of physical maps having various geographical coverages, fields of view, map scales, cartographic projections, compass orientations, map overlaps, etc. Associated with each map portion image is specific data which permits the location (latitude and longitude) of any point in the image, the field of view and the unique relationship to all other map portion images to be efficiently determined. A keyboard and/or other input device is provided by which an operator can request the display of any map portion image which is spatially related (by field of view, adjacency, etc.) to the currently displayed image without need for any external map-related information whatsoever. A programmed processor automatically determines the unique map portion image which satisfies the user request, accesses the selected image from the optical storage unit and causes it to be displayed.

13 Claims, 8 Drawing Sheets

FIG. 7(A)
PROCESS A

FIG. 7(B)
PROCESS B

FIG. 7(C)
PROCESS C

AUTOMATED MAP DISPLAY SYSTEM

FIELD OF THE INVENTION

The present invention relates to an automated map display system, and more particularly, to an automated map display system capable of interrelating map images derived from any assortment of commercially available physical maps.

BACKGROUND OF THE INVENTION

In the past, maps have been primarily made available in paper form. Sometimes a series of maps having different geographic coverage, various fields of view, and different map scales, have been bound into an atlas. A common way of using an atlas is to refer initially to the map with the largest field of view and to identify from that map another map having a smaller field of view which would cover the area of interest in more detail. It then is necessary to page through the atlas to locate the more detailed map, and it is often necessary to interrelate several maps in order to view adjacent geographic areas.

In applications where frequent reference to a map is required, e.g., routing and scheduling applications, territorial assignments, site location, geographical analysis, etc., the use of a bound atlas and the attendant need to page through the atlas is both tedious and time consuming. Therefore, automated map display systems have been proposed wherein map images are stored on an optical disk and may be selectively accessed and displayed on a viewing screen. Images of portions of a map are stored as frames on an optical disk and may be selectively recalled for display. Specific map portions may be identified by movement of a locator on a display screen to initiate the access and display of the desired stored images of map portions.

A serious drawback of the prior automated map display systems has been the need to store pointer data to relate all the map frames that store images of contiguous map portions. In addition, in order to establish a workable set of pointers, it has been necessary to impose rigid conditions on the types of maps that can be used as source material. For example, the prior automated map display systems are limited to map sets that are produced to a uniform standard cartographic projection and scale (such as United States Geological Survey (USGS) maps), that cover specified geographical areas in a rigid, grid-like manner, and that can be physically joined together without distortion. Thus, rather than using the maps which offer the most information content for the specific geographical areas of interest, i.e. maps which have up-to-date street level detail of a city or a particular area of a city, the prior art automated map display systems have had to utilize maps that meet the cartographic constraints listed above, even though such maps may lack most of the information desired.

More specifically, the prior art automated map display systems have been unable to integrate physical maps from different sources which have different scales, fields of view, compass orientations, cartographic projections, etc., and which are related only in the sense that they cover the geographic area of interest and contain the necessary information. These types of maps, e.g., street maps, are often most useful in the practical applications of an automated map display system. It has not hitherto been possible, however, to interrelate a heterogeneous set of maps such that a required set of frame relationships could be properly defined to interrelate the adjacent frames of map images. Thus, a major shortcoming of the automated map display systems of the prior art has been a severe limitation on the type of physical maps that could be used to generate map images stored on the optical disk.

The prior art systems have also suffered from inefficient use of map image storage areas because of the inability to accomodate disjoint images produced from a single physical map, i.e., maps with "holes" in them. For example if the physical map includes several areas of interest for display purposes, such as several towns or cities, which are separated from each other by geographical areas of little interest for display purposes, e.g., large bodies of water, desert regions, mountainous areas, prior art systems required storing map portion images corresponding to the areas of little interest as well as images corresponding to areas of great interest. In other words, the map portion images corresponding to the areas of little interest could not be deleted because of difficulty that would arise in relating the remaining disjoint map portion images.

Also, the prior art map display system that relied on rigid map specifications often required the user of the system to have a thorough understanding of the geographic area covered, the range of latitude and longitude involved, map scales, fields-of-view, and knowledge of each optically-stored map. This reduced the ease with which operators could use the map display systems and, hence, restricted use of the systems.

The prior art systems, being constrained by dependence on rigidly structured map specifications, are limited in the type and number of map display commands that can be implemented without requiring extensive searching through the optically-stored map portion image data base in a procedure similar to leafing through an atlas of paper maps. This shortcoming limits the speed of response or places undue restraints on the number of maps that can be used in the system.

OBJECTS AND SUMMARY OF THE INVENTION

An object of the present invention is an automated map display system capable of interrelating images of map portions on the basis of the latitude and longitude coverage associated with each map portion.

Another object of the present invention is an automated map display system for selecting and displaying an image of a map which encompasses a desired latitude and longitude and with a field of view closest to a selected field of view.

A further object of the present invention is an automated map display system that does not require explicit pointers to interrelate images of map portions to each other.

Yet another object of the present invention is an automated map display system capable of interrelating maps of any geographical coverage, any map scale, any field of view, any defined cartographic projection, and any compass orientation.

Still a further object of the present invention is an automated map display system capable of displaying images of map portions wherein images of adjacent map portions are overlapped in varying degrees, even within the different image levels of a given physical map.

Another object of the present invention is an automated map display system capable of interrelating disjoint map portion images produced from a single map.

A further object of the present invention is an automated map display system providing greater functionality and user control than possible in prior art systems.

Still another object of the present invention is an automated map display system that can be used by persons having no specialized skills or knowledge of maps, cartography, or geography.

These and other objects of the present invention are accomplished by a map display system for electronically storing, accessing, and displaying images generated from physical maps, the system comprising image storing means for storing images of the physical maps, each of said map images having corresponding geographic field of view data representing the geographic coverage in longitude and latitude available as a displayed video image derived after generating the map image from the corresponding physical map, a longitude value representing a reference longitude for the map image, and a latitude value representing a reference latitude for the map image, means for displaying the map images, means for selecting the desired latitude, longitude, and field of view of a map image to be displayed, and means for accessing from the storing means and for transferring to the displaying means the unique stored map image that includes the selected latitude and longitude and has corresponding field of view closest to the selected field of view.

The system and method of the present invention are structured around an original data structure related to the displayed image, and provides the user with extensive functionality by reflecting the exact relationship among all video images of maps and portions thereof as access tools. This allows the efficient implementation of novel display functions such as: "MAP-UP" to display the base-level map portion image that includes any selected latitude and longitude of a currently displayed map portion image but covering, for example, three times the field of view of the displayed map portion image; "MAP-DOWN" to display the base-level map portion image that includes any selected latitude and longitude of a currently displayed map portion image but covering, for example, only one third of the area of the displayed map portion image; "REFERENCE" to display the map portion image that includes the selected latitude, longitude and field of view of the currently displayed map portion image on the appropriate one of a user-defined set of map portion images of a user-specified reference map; "DETAIL" to display any selected latitude and longitude on the base-level map portion image having the smallest available field of view and "BOX" to display the map portion image that best displays a full-screen map portion image of the latitude-longitude area selected from the currently displayed map portion image.

BRIEF DESCRIPTION OF THE DRAWINGS

The manner by which the above objects and other objects, features, and advantages of the present invention are obtained will be full from the following detailed description when considered in view of the drawings wherein.

DETAILED DESCRIPTION

Figure 1:
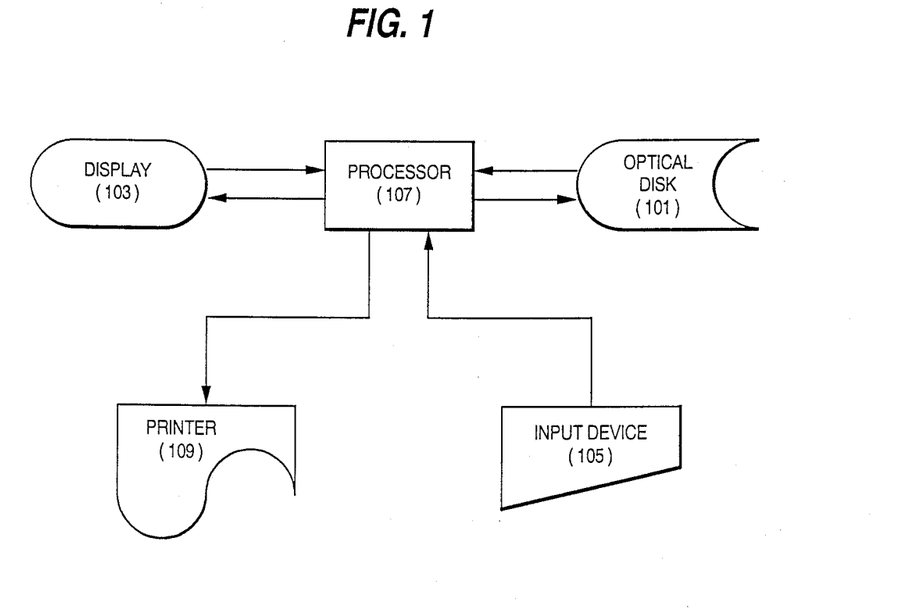
FIG. 1 is a schematic block diagram of the automated map display system of the present invention.

FIG. 1 is a schematic block diagram of a map display system for electronically accessing and displaying images generated from physical maps. The map display system includes an image storing means for storing images of the physical maps wherein each of the map images has corresponding geographic field of view data representing the geographic coverage in longitude and latitude available as a displayed video image derived after generating the map image from the corresponding physical map, a longitude value representing a reference longitude displayed on the map image, and a latitude value representing a reference latitude displayed on the map image. As embodied herein, the image storing means comprises an optical storage unit, such as a laser disk unit or other device for storing and retrieving optical images wherein the optical images are stored as frames of map images at associated address locations.

The map display system further includes means for displaying the map images. As embodied herein, the displaying means includes a display 103, such as a cathode ray tube display having a selectively positionable locator.

The map display system of the present invention further includes means for selecting the latitude, longitude, and field of view of a map image to be displayed. As embodied herein, the selecting means comprises an input device 105 such as a keyboard including keys and other means (such as a "mouse") for positioning a locator displayed on the display 103. The selecting may also be accomplished by a system request generated by an application program being executed by a processor.

If a map portion, including a point identified by the locator and having an associated reference latitude and longitude, is displayed on the screen of the display 103, it is possible to calculate the latitude and longitude of the locator on the display device 103 which corresponds to the pixel location of the locator using, among others methods described in Snyder, *Map Projections Used By The U.S. Geological Survey*, Geological Survey Bulletin 1532, 2d. ed. (1983). In this manner, manipulation of the locator and the control keys of the input device 105 enable the selection of a map portion image having the desired latitude and longitude included within a map image of a physical map where the map portion image is adjacent to the map portion image being displayed on the display 103 as well as the selection of a map portion image that includes a desired latitude and longitude and has a specified field of view that is either larger or smaller than the field of view of the map portion image presently displayed on the display 103.

The Snyder publication describes a series of methods for determining a Cartesian 'x,y' value for a given latitude/longitude on a physical map of a given projection, scale, etc. The methods that are described allow transformation from a latitude/longitude position to a reference 'x,y' on the physical map, or from a physical map position back to latitude/longitude.

The algorithms for determining the latitude/longitude (on a display screen) for a point may use the Snyder algorithms as follows. Given that the center latitude/longitude of a displayed frame is known or can be calculated, the Snyder algorithms can determine the center of the displayed frame in Cartesian inches. Moreover, given the pixel offsets from the screen center for the point in question, the Cartesian coordinates for the center of the displayed image (derived above), information about the field-of-view (in inches), and the specifications of the display device (number of pixels across and down, for example), it is possible to calculate the Cartesian coordinates (in map-inches) for the point in question. Also, given the Cartesian (map-inches) coordinates for the point, the Snyder algorithms can be used (in reverse) to determine the latitude/longitudinal of the point.

The map display system of the present invention also includes means for accessing from the storing means and for transferring to the display means the stored map image that includes the selected latitude and longitude and has corresponding field of view closest to a selected field of view. As embodied herein, the accessing means includes a programmed processor 107 connected to the optical disk 101, the display 103, the input device 105, and an optional printer 109. Using, among others, techniques disclosed in the above-identified work of Snyder, the processor 107 determines from the display 103 the current position of the locator on the display in terms of pixel values and translates the position of the locator to a corresponding latitude and longitude position. Further, the processor 107 receives the control information from the input device 105 and determines which map portion image is to be selected and displayed on the display 103. The processor 107 accesses the optical disk 101 to retrieve the frame that contains the selected map image and transfers the map image to the display 103. The printer 109 is preferably of a type that is capable of generating a hard copy of the map portion image displayed on the display 103 as well as printing out control information entered through the input device 105.

Figure 2:
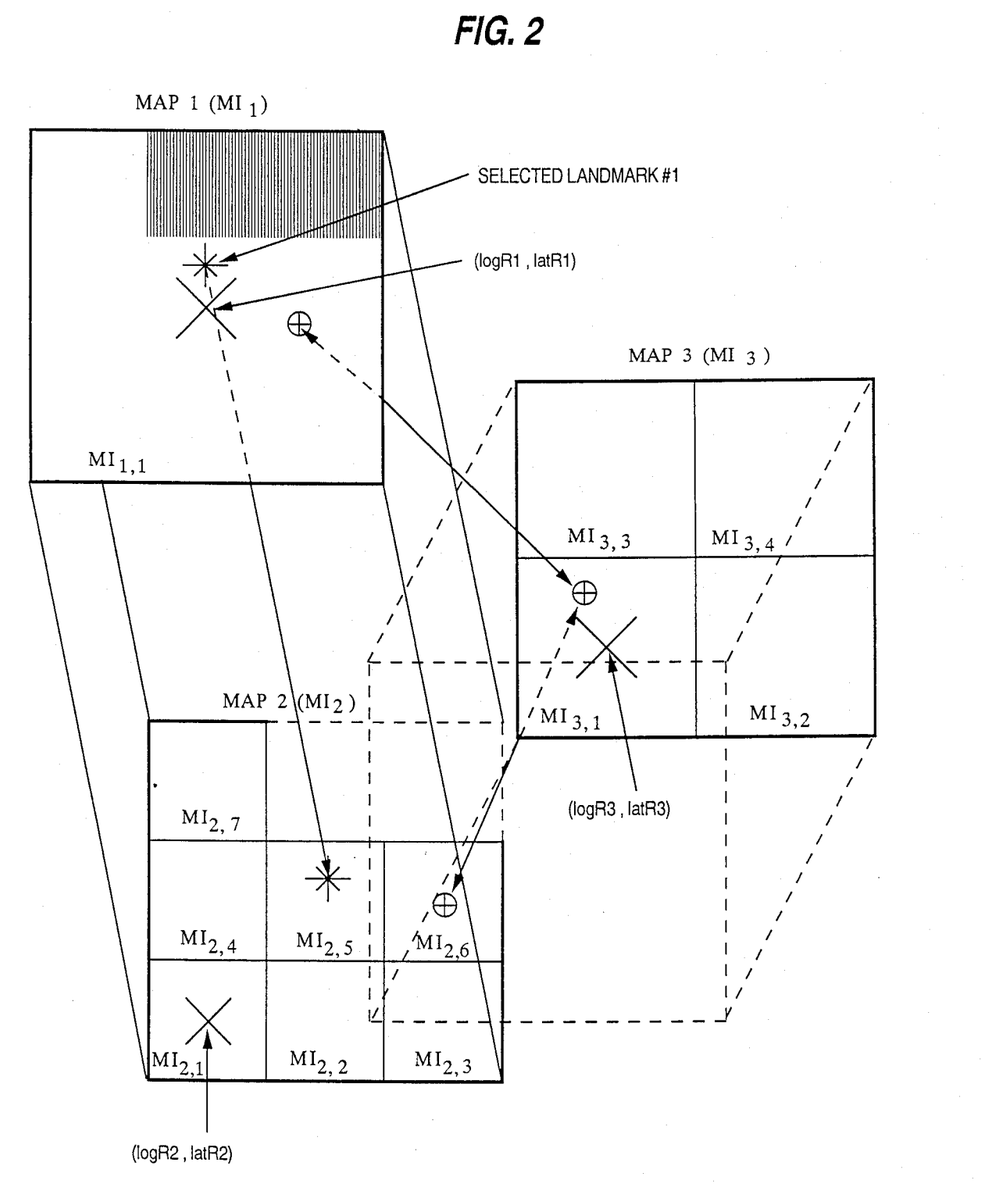
FIG. 2 a schematic illustration of the interrelationship of several maps within the automated map display system of the present invention.

FIG. 2 is a schematic illustration of the interrelationship of three different map images corresponding to physical maps. Map image block 1 ($MI_1$) and map image block 2 ($MI_2$) are interrelated in that they are blocks of images generated from the same physical map and, thus, include the same geographical area, but at different fields of view. Map image block 1 is stored as a single map portion image $MI_{1,1}$ and, therefore, is stored as a single frame in the optical disk unit 101. Map image block 2 is generated from the same physical map as map image block 1, but includes map portion images such that each has a field of view that is one third of the field of view of the map portion image $MI_{1,1}$. Since the map portion image block $MI_2$ consists of map portion images with the smallest field-of-view available for the map, it is described as the "base-level" image block. Each of blocks $MI_1$ and $MI_2$ is represented in the map family file data records (see FIG. 5) by a block data record containing the reference longitude and latitude (LogR1/LatR1 for block $MI_1$ and LogR2/LatR2 for block $MI_2$.)

The dimensions of map portion image $MI_1$ in angular degrees are $\Delta$ log° by $\Delta$ lat°. The dimensions of map block 2 are similarly $\Delta$ log° by $\Delta$ lat°, but since the displayed ge width is one third the displayed geographic width for map image 1, each map portion image for map image 2 has a dimension in degrees of $\Delta$ log/3° by $\Delta$ lat/3°.

As illustrated in FIG. 2, adjacent map portion images of map 2, e.g., $MI_{2,7}$ and $MI_{2,8}$, do not provide for overlap in the portions of the physical map illustrated by the map portion images. The automated map display system of the present invention, however, can accommodate varying degrees of overlap among adjacent map portion images so that upon changing the display from one map portion image to an adjacent map portion image the position of the locator on a display 103 remains constant in terms of a specific latitude and longitude common to the overlapping map portion images, but shifts to a different pixel location of the screen on the display 103.

As stated above, map image 1 and map image 2, as shown in FIG. 2, were generated from the same physical map. One example of the operation of the automated map display system of the present invention can be shown by assuming that initially map portion image $MI_{1,1}$ depicting the entire map image 1 is displayed on the display 103. The operator manipulates the appropriate keys on the input device 105 to place the locator at a location on the screen, e.g., a landmark(*), depicted in the map portion image $MI_{1,1}$. The processor 107 determines the latitude and longitude of the landmark from the pixel location of the locator within the matrix of the screen of the display 103 and from the reference point, LogR1, LatR1, of the map portion image $MI_{1,1}$ using cartographic projection methodologies described herein.

If a greater level of detail of that location is desired, an appropriate key is selected on the input device 105 to request that a map portion image that includes the specified location (in terms of latitude and longitude) be displayed at the next smaller field of view. As will be described hereinafter, the processor 107 interprets the request to identify which of the map portion images, $MI_{2,1}$–$MI_{2,7}$, of the map image 2 includes the designated latitude and longitude and retrieves the frame storing the appropriate map portion image from the optical disk 101 and displays the frame on the display 103.

If, as in this example, the designated latitude and longitude position is included in the map portion image $MI_{2,5}$, the processor 107 will access the frame in the optical disk 101 storing the map portion image $MI_{2,5}$ and control the display 103 to display that map portion image and to move the locator to the designated latitude and longitude on that map portion image. If the operator wishes to examine the image of the adjacent map portion image directly south of the map portion image $MI_{2,5}$, the operator merely indicates through the input device 105 that he desires the display of the map portion image directly south of the map portion image presently displayed, and the map portion image $MI_{2,2}$ will be retrieved and displayed.

If the operator requests a map portion image that is adjacent in the northerly direction to the map portion image $MI_{2,5}$, the processor 107 computes the reference latitude and longitude for the map portion image corresponding to the request. In the case of map image 2 shown in FIG. 2, there is no stored map portion image adjacently north of the map portion image $MI_{2,5}$. The processor 107 then automatically selects a map portion image having a field of view closest to the field of view of the map portion images of map image 2 which, in the example of FIG. 2, corresponds to the map portion image $MI_1$ comprising map image 1. This method provides the most suitable map portion image of all those available. The shaded region of map portion image $MI_1$ includes the requested latitude and longitude and, therefore, the map portion image MI1 will be retrieved from the optical disk unit 101 and displayed on the display 103.

As another example, if the map portion image $MI_{2,6}$ is displayed on the display 103 and the operator enters through the input device 105 a request or the processor 107 generates a system request to display the map portion image immediately adjacent in the northeast direction, it is clear from FIG. 2 that such map portion image is not present in either map image 2 or map image 1. Map image 3 of FIG. 2 includes the map portion image $MI_{3,1}$ that includes the area immediately adjacent in the northeast direction to the map portion image $MI_{2,6}$.

The map portion images $MI_{3,1}$–$MI_{3,4}$ comprising map image 3 are generated from a physical map different than the physical map used to generate the map portion images corresponding to map images 1 and 2 and has a field of view different from the fields of view of each of map image 1 and map image 2. Nonetheless, the automated map display system of the present invention determines the longitude and latitude of the map portion image adjacent in the northeast direction with respect to the map portion image $MI_{2,6}$ of map image 2 and selects the map portion image with a field of view closest to the displayed field of view of the operator request or the system request. As a consequence, the map portion image $MI_{3,1}$ of map 3 will be displayed.

This unique feature of the present invention allows the user to "fall off the edge of a map" without getting lost and without having to manually select a new map to view. The current invention is able to select and display the best map image automatically.

Figure 3:
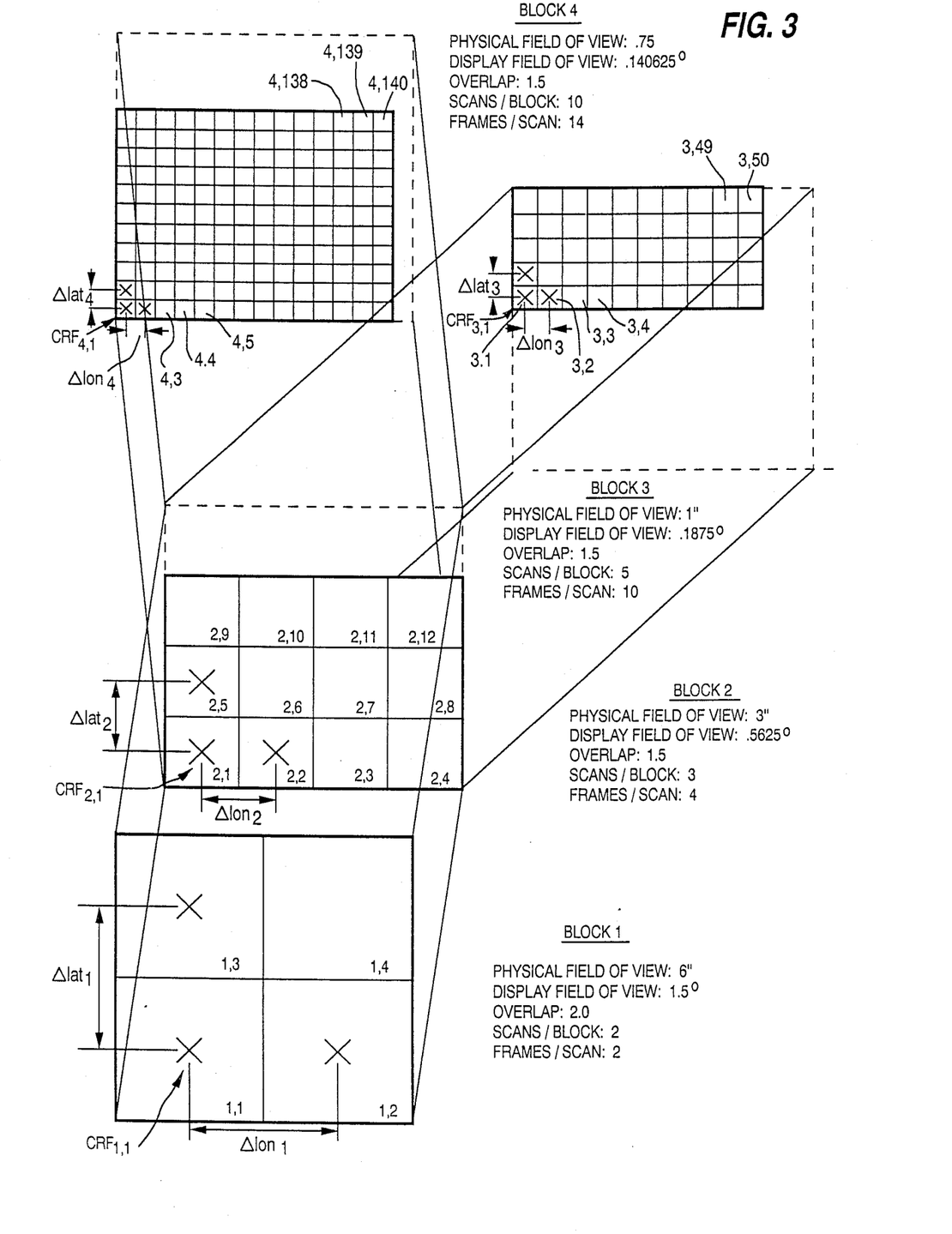
FIG. 3 is a schematic illustration of the relationship between map portion images stored in frames on an optical disk and areas of the physical map from which those images were made.

FIG. 3 is a schematic illustration demonstrating the relationship between a physical map and the corresponding map portion images as stored on the optical disk 101. As shown in FIG. 3, the physical map is used to generate a plurality of blocks of map portion images wherein each map portion image is stored in a corresponding, addressable frame of the optical disk 101. In generating the map portion images from the physical map, the latitude and longitude of reference points of the physical map must be known. Thus, the latitude and longtitude of each of the map image block reference points $CRF_{1,1}$, $CRF_{2,1}$, $CRF_{3,1}$, and $CRF_{4,1}$ are known.

For each block, the physical field of view for a map portion image corresponding to a frame is given in terms of map inches. As shown in FIG. 3, each frame in block 1, i.e., $F_{1,i}$, has a field of view in map inches which is twice the field of view in map inches of the frames in block 2, i.e., $F_{2,i}$, and six times the field of view in map inches of the frames included in block 3, i.e., $F_{3,i}$.

FIG. 3 does not illustrate any overlap between adjacent frames. It is contemplated, however, that in most cases there would be overlap in the direction of both latitude and longitude and that the overlap would be measured in constant degrees.

As shown in FIG. 3, within a block of frames there is a reference frame. For example in block 1 the reference frame is $F_{1,1}$ and the latitude and longitude of the center of the reference frame, $CRF_{1,1}$, is precisely known. Two additional dimensions are known for each block of frames including, with respect to block 1, $\Delta \log_1$, which is the distance in longitude between the centers of adjacent frames, for example, the frames $F_{1,1}$ and $F_{1,2}$. Similarly, the difference in latitude, $\Delta lat_1$, between the centers of adjacent frames, for example, the frames $F_{1,1}$ and $F_{1,4}$, is known. Given knowledge of the relative position of a frame within a block, the latitude and longitude of the reference frame $CRF_{1,1}$, the frame-to-frame increment in longitude $\Delta \log_I$, and the frame-to-frame difference in latitude $\Delta lat_I$, then the latitude and longitude of any point within a map portion image that is stored and displayed as a frame included in a block of frames can be precisely determined by the processor 107.

Having generated the map portion images corresponding to a physical map at selected fields of view in terms of map inches, the map images are stored in corresponding frames on the optical disk storage unit 101. Each of the frames has associated therewith a corresponding frame address that enables direct addressing and accessing of the frames included on the optical disk.

Figure 4:
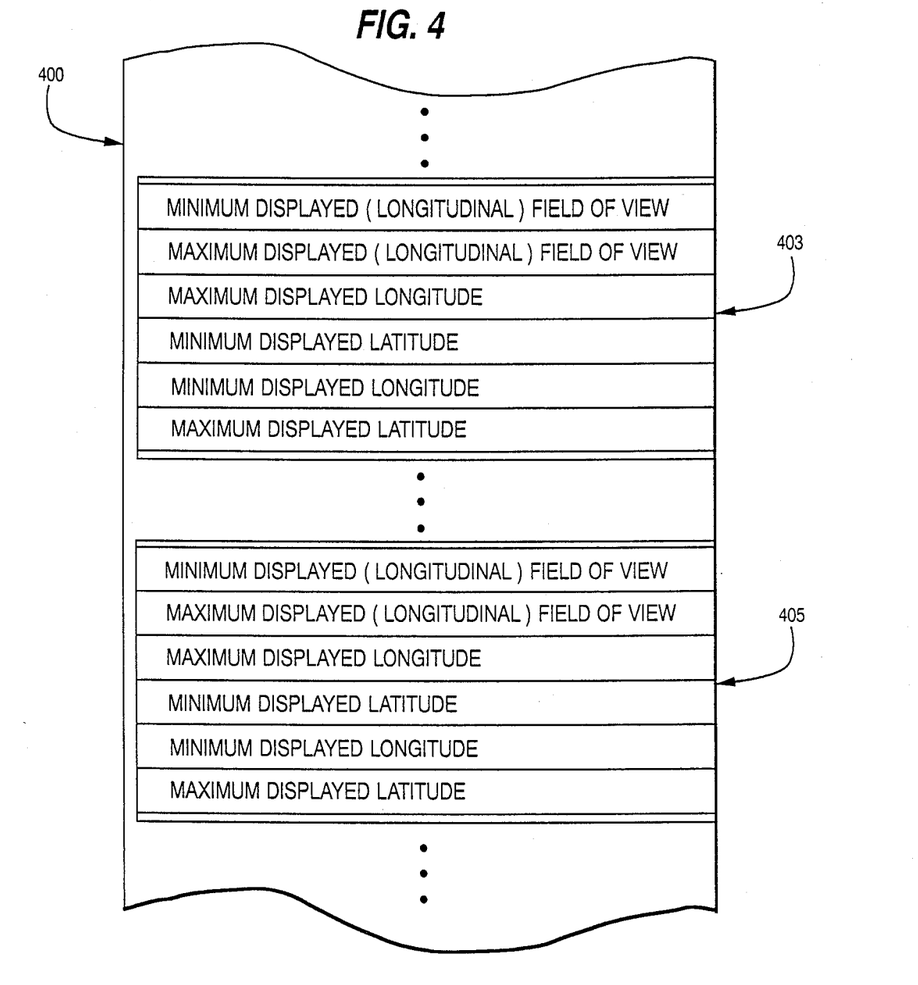
FIG. 4 is a schematic illustration of a map portion index file including data relating to each map having corresponding map image portions stored in frames of the optical disk storage unit of FIG. 1.

FIG. 4 is a schematic illustration of a map portion index file including data relating to the field of view of the map images having corresponding map portion images stored in frames of the optical disk storage unit 101. As shown in FIG. 4, the map portion index file 400 includes map index data 403 through map index data 405. The index data may, for example, be stored in a memory internal to the processor 107.

Each map index data entry in the map portion index file 401 pertains to a different physical map and identifies the parameters under which map portion images have been generated from the corresponding physical map. For example, the map 1 index data 403 includes entries identifying for physical map 1 the minimum field of view in, for example, seconds of longitude, for a block of map portion image frames generated from physical map 1, the maximum field of view in seconds of longitude for a block of map portion image frames generated from physical map 1, the maximum and minimum longitude displayed by map portion images generated from the physical map, and the minimum and maximum latitude displayed by map portion images generated from physical map 1. This data enables a determination to be made whether or not a map portion image frame is stored in the optical disk storage unit 101 that fulfills the requirements of a map portion image display request entered through the input device 105 or generated as a system request by the processor 107.

The minimum field of view and the maximum field of view included in each map index data record 403, etc. enable the selection of a specific map based on the amount of geographic coverage included in a video image.

In other words, if a map image display request specifies a field of view that is smaller than any entry for minimum field of view in the map index data records 403, etc. found in the map index file 400, the processor 107 will determine that there is no suitable map image stored in the optical disk storage unit 101. Similarly, if the requested field of view corresponds to a value that is between the minimum and maximum field of view values for the map index data record 403, and the requested longitude corresponds to a value between the minimum and maximum longitude entries for data record 403, and the requested latitude corresponds to a value between the minimum and maximum latitude values for data record 403, then the processor will determine that a map image included in the stored map 1 satisfies the map image display request.

Figure 5:
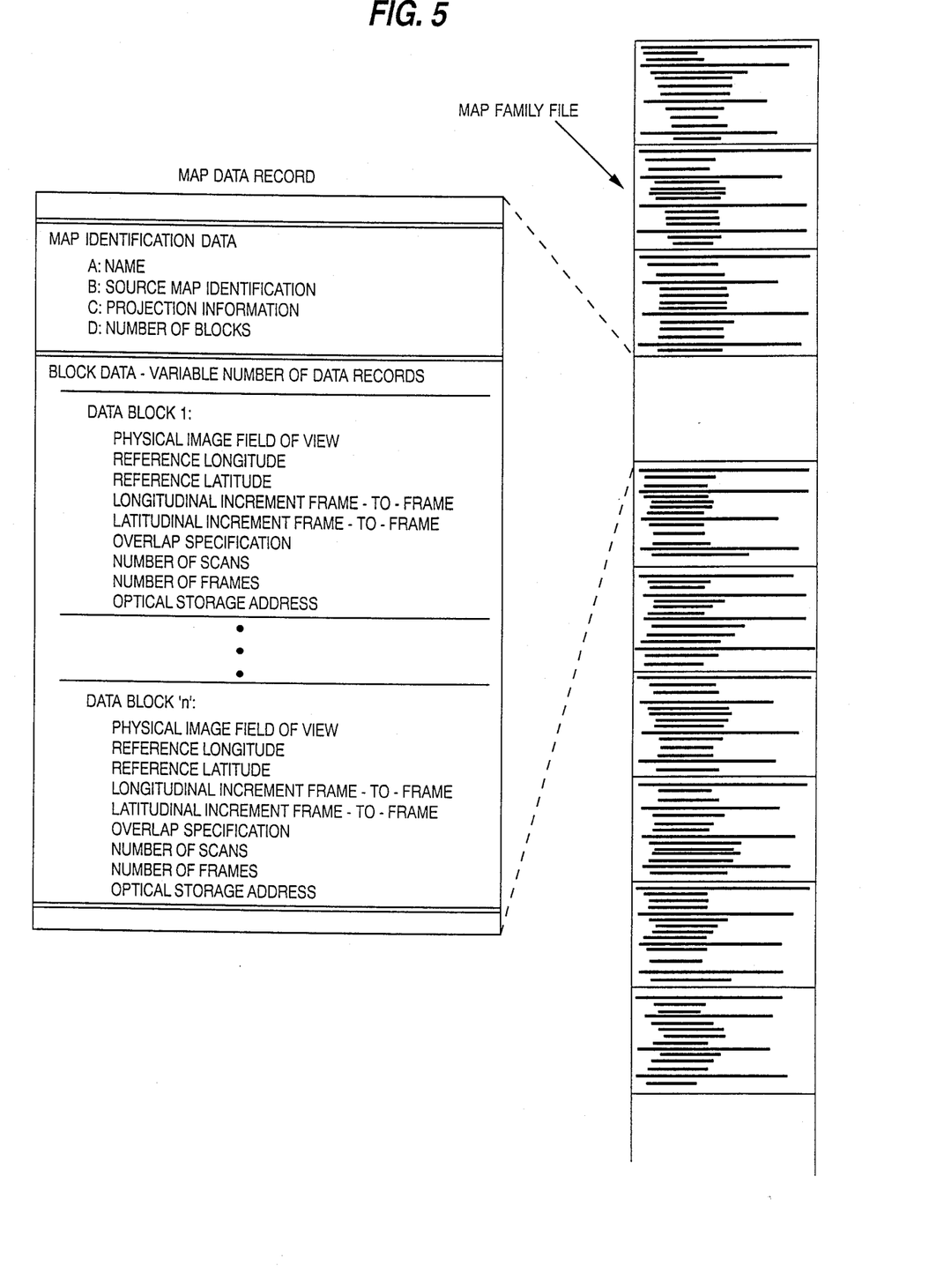
FIG. 5 is a schematic illustration of a map family file including detailed data describing the images of the map stored as frame data in the optical storage unit of FIG. 1.

Each map index data entry within the map portion index file 400 corresponds to a different map data record in the map family files as schematically illustrated in FIG. 5. The map family file illustrated in FIG. 5 is made up of map data records, each of which includes map identification data identifying the name and source of the physical map that served as a source for the map images stored as frames in the optical disk 101 and described by the entries in the map family file shown in FIG. 5. The projection identification data identifies the cartographic projection method used in the physical map, and identifies reference parameters used by the processor 107 to display the map portion images properly and to determine accurately the pixel coordinates for the marking and display of geographic data.

Each map data record in the map family file includes a variable number of records with each record corresponding to a different block of frames of map images. As seen from FIG. 5, the block data identifies the field of view utilized in photographing the physical map to generate frames of map images. The physical image field of view for each block of frames is expressed in units of map inches per frame. The block data further identifies the number of scans per block and the number of frames per scan. With reference to block 2 shown in FIG. 3, the frames $F_{2,1}$, $F_{2,2}$, $F_{2,3}$ and $F_{2,4}$ comprise a single scan of the block. Accordingly, block 2 includes three scans with four frames being included in each scan.

The block data further includes the latitude and longitude of the reference point in the reference frame, i.e., $CRF_{1,1}$ for block 1 of FIG. 3. The frame-to-frame increment in longitude, $\Delta log°_i$, and the frame-to-frame increment in latitude, $\Delta lat°_i$, are also stored as block data. Finally, each block data record includes an optical disk address that corresponds to the frame number in the optical disk storage unit 101 of the reference frame for the corresponding block. For example, the map image associated with the reference frame $CRF_{1,1}$ of block 1 is stored at the disk address indicated as the disk address data for block 1 shown in FIG. 5. The map images corresponding to the remaining frames of block 1 (FIG. 3), i.e., $F_{1,2} \ldots F_{1,4}$, are stored at successive frames within the optical disk storage unit 101. Thus, processor 107 computes the actual frame address within the optical disk storage unit for a selected frame storing a requested map portion image by determining the relative position of the map image within the sequence of frames included in the block. The data stored as block data for each block of frames enables the microcomputer 107 to calculate the field of view of a map portion image within a block, determine the range of latitude and longitude covered by each map image, and access a frame in the optical disk storage unit 101 storing a desired map portion image.

Figure 6:
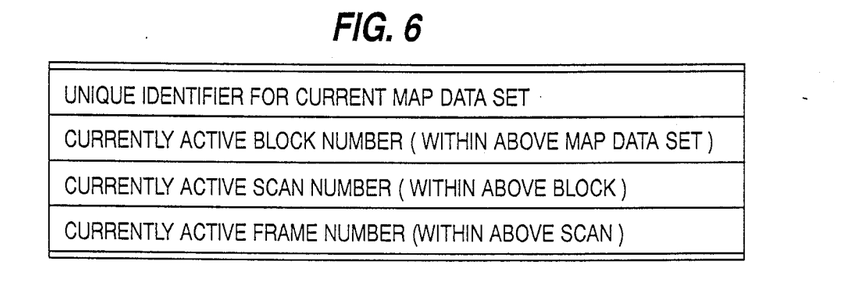
FIG. 6 is a schematic illustration of a current frame table maintained by the microprocessor 107 of FIG. 1.

FIG. 6 is a schematic illustration of a current frame table maintained by the processor 107, for example, in its internal memory. The current frame table stores information that is derived from the block data associated with the map portion image currently being displayed as well as other necessary data. When a map is selected in response to a map portion image request, the complete map family file for that map and all its blocks are placed into memory of the processor 107. Based on the map portion image request, a block is selected from the set of blocks, a scan is selected from that block, and a frame from that scan. The offset into the optical disk frame set corresponding to the pertinent block is calculated, and the map portion image stored in the frame is then displayed. Since the entire map family file is already in the processor memory, the current frame table need only contain the map identifier, block number and the scan/frame identifier. All other values that might be needed by any calculations or map portion display requests can be derived by use of the current frame table data and the data in the map family file. An advantage of this method is that, since most map portion image change requests can be satisfied within the current map family file the response time is faster, and, information about previously displayed frames, or special frames (for example, home map or reference map) may be stored efficiently.

Figure 7A:
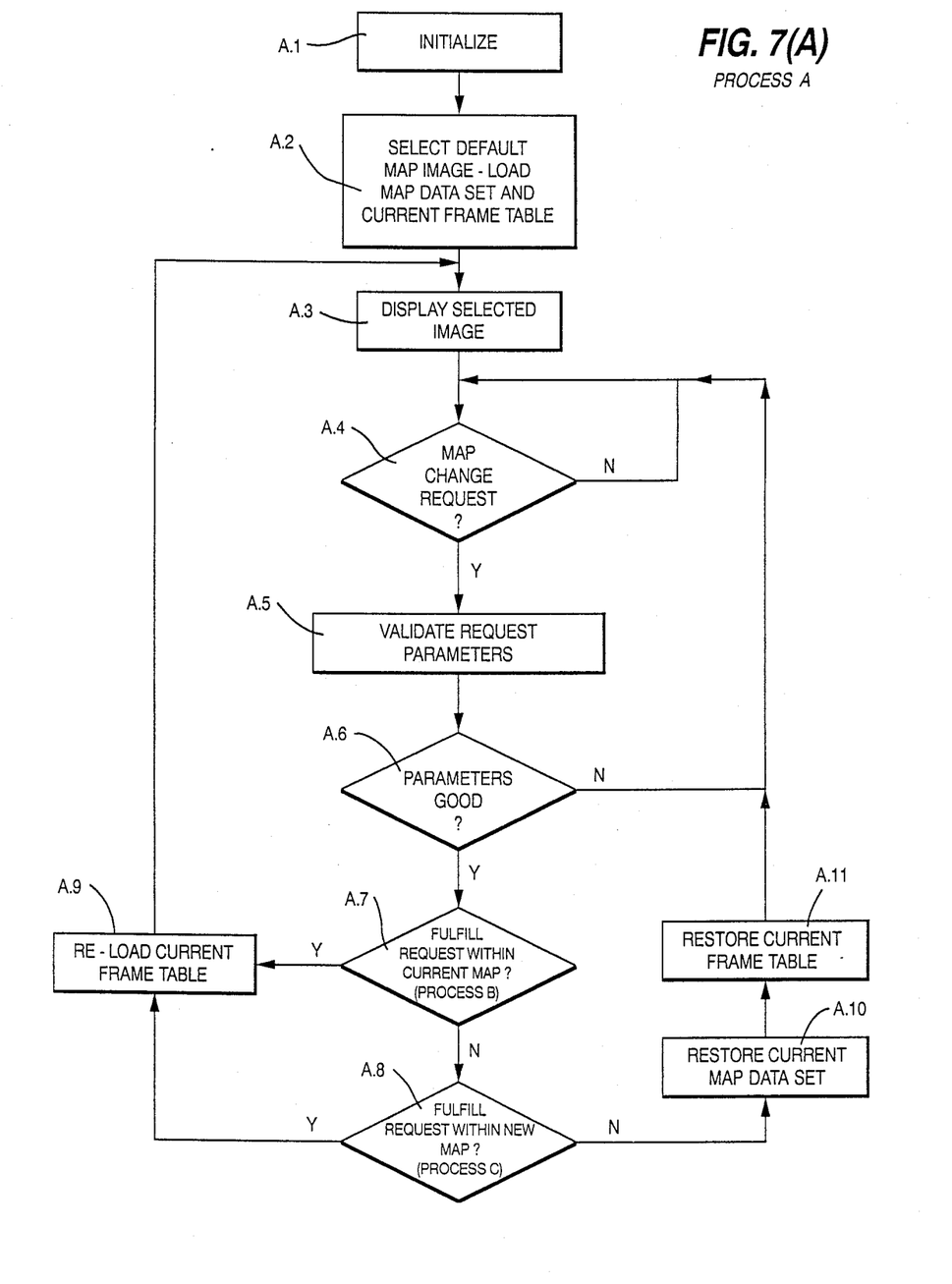
FIGS. 7(A), 7(B), and 7(C) comprise a flow diagram for explaining the operation of the automated map system of the present invention.
Figure 7B:
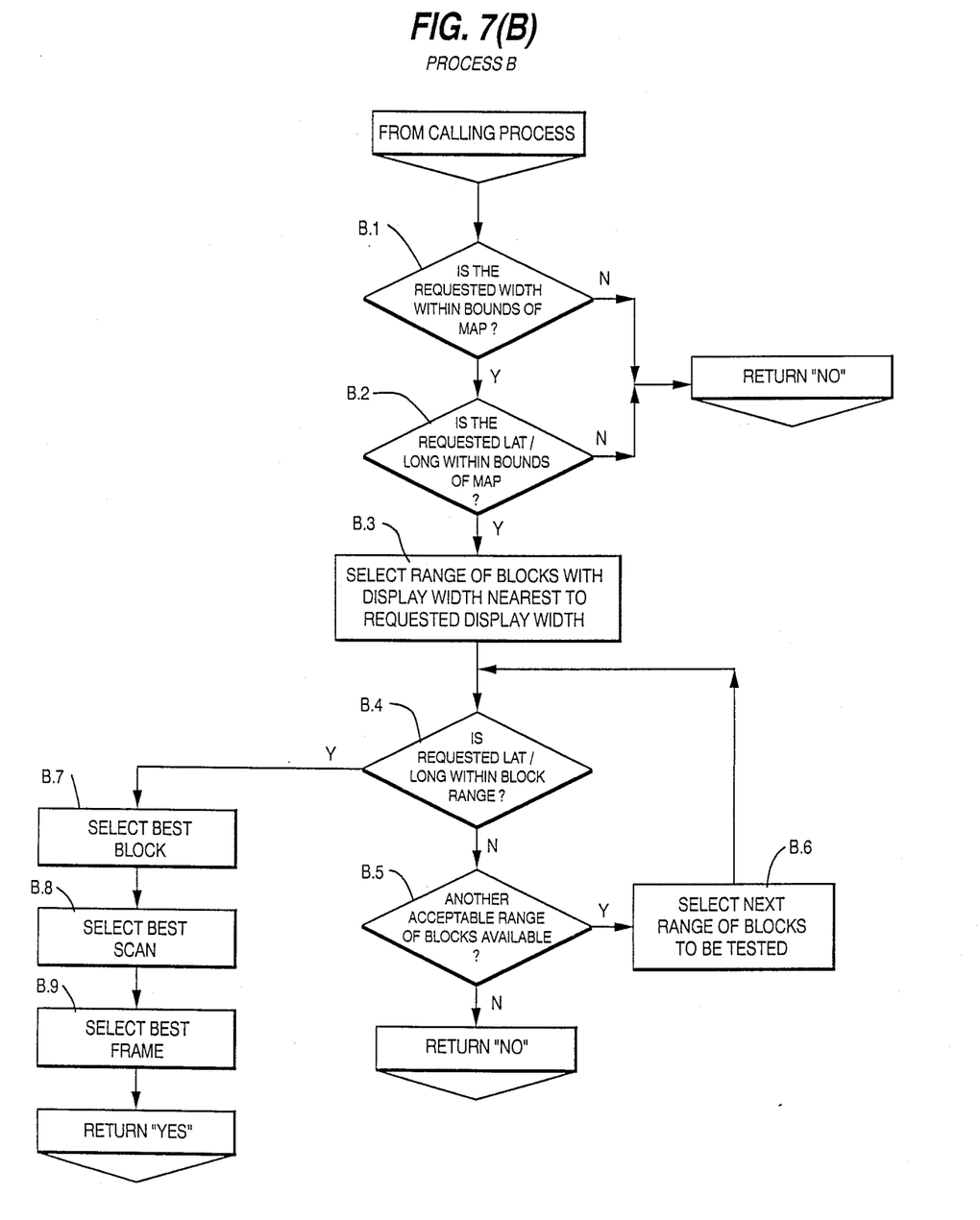
Figure 7C:
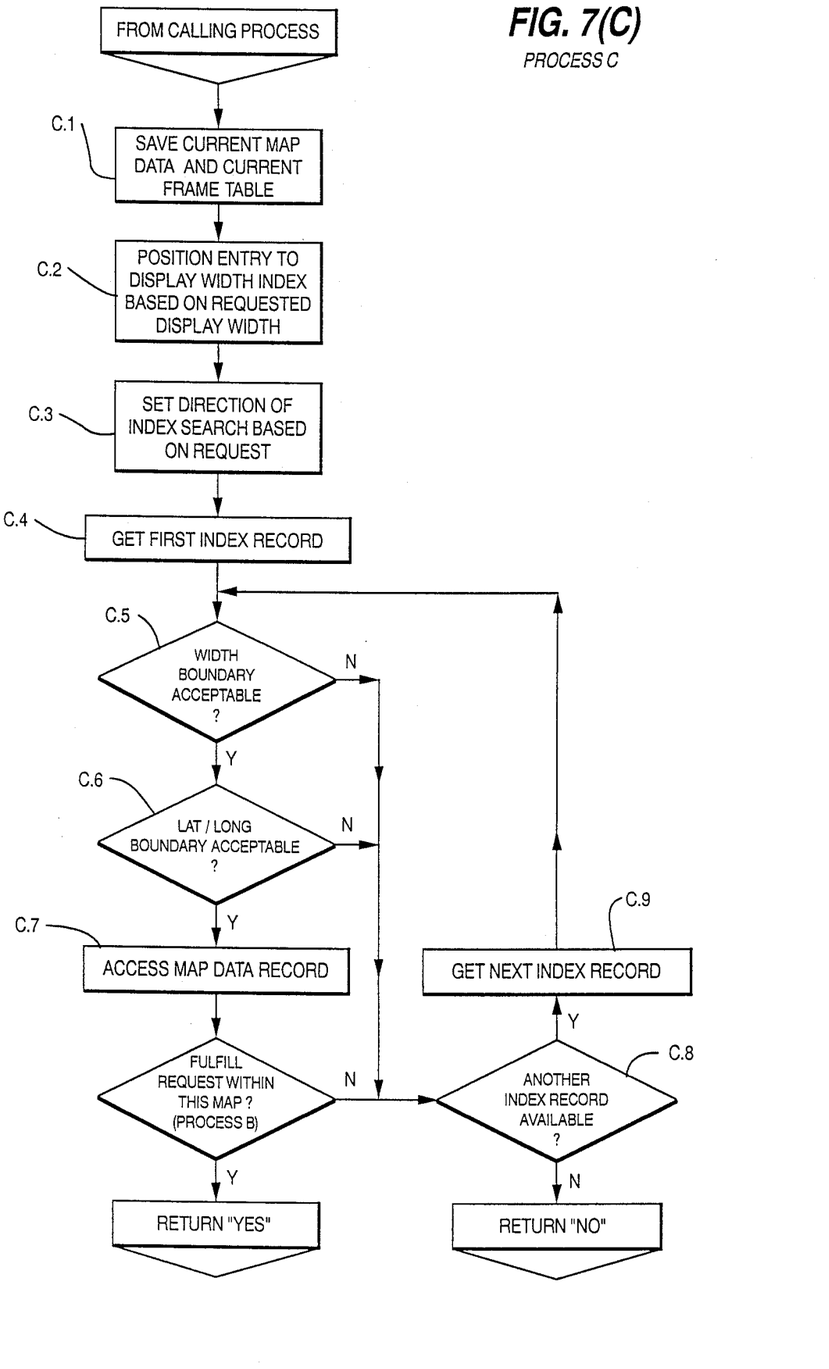

FIGS. 7(A), 7(B), and 7(C) comprise an operational flow diagram illustrating the operation of the automated map display system of the present invention. The complete operation may be described in terms of three processes, and, dependent upon the request type made by the operator or by an applications program, these processes may be combined in several different fashions. It will be apparent to those skilled in the art that many combinations of the following example processes and/or their individual steps are possible and may be implemented as required without departing from the scope of the invention, and it is intended that the present invention cover the modifications and variations of these processes provided that they come within the scope of the appended claims and their equivalents.

Map image change requests are made up of information specifying direction of apparent movement (where is the new image relative to the current image) and position information (latitude/longitude of the locator on the current display or latitude/longitude of the point of interest.) Depending on the type of request, new information may be derived about the field of view desired and about the desired latitude/longitude coverage. For example, a map request for "MAP-UP" is a request for the display of the base-level image showing the current locator position and three (or more) times the field of view shown by the current map image. Given that the current field of view might be 1.5° longitude, it may be derived that only images with a field of view of at least 4.5° longitude would be acceptable. As a further example, if the request were for the display of an image laterally adjacent to the current map image measured from the latitude/longitude position of the locator, the request could be satisfied by an image with the same field of view, encompassing a point of latitude and longitude calculated by incrementing or decrementing, as the case may be, either or both the latitude and longitude of the locator.

The following description illustrates the process flow for a typical request, and uses all the aspects of each process.

PROCESS A—FIG. 7(A)

As shown in FIG. 7(A), the first step (A.1) is to initialize and test the hardware, and to check for file and system integrity. Various routines may be included in the initialization step (due to system differences or specific hardware requirements) including self-tests by the processor and other devices.

After the processor 107 executes the initialization routines and determines that no fault exists within the automated map display system, step A.2 is executed, in which the processor 107 selects from the optical disk 101 a default map image (either one that has been set by the user or one selected by the system), the corresponding map data set is retrieved and placed into processor memory, and the current frame table (FIG. 6) is loaded with the proper values for the current map, current block, current scan, and current frame. The default map portion image provides a reference map portion image in terms of latitude, longitude and field of view which will enable the selection of any new image having: (1), a field of view larger, smaller or equal to the currently displayed image and (2) a field of view encompassing a geographic area that is laterally adjacent to the current image, which encompasses the currently displayed area, or which is a subset of the currently displayed area.

In step A.3, the optical disk track number is calculated and the optical disk is instructed to display that frame. In the event that the default map image is already in place as the current image, the frame containing the appropriate map image will be retrieved from the optical disk 101 and transferred to the display device 103 under the control of the processor 107. In all other cases, the map image to be displayed will be retrieved in response to an operator request or an application systems request.

Given the information in the current frame table, in the map data set, that each block of images is stored as a contiguous set on the optical disk, and that the optical disk address of the reference disk for the block is known, the optical disk address 'A' of the frame to be displayed may be calculated as:

$$A = Ra + ((SC-1)*FrS) + (Fr-1)$$

where 'Ra' is the optical disk address of the reference frame for the current block, 'Sc' is the current scan within the block, 'FrS' is the number of frames per scan, and 'Fr' is the frame number within the scan.

Until a request is entered for the display of a different map image, no map request will be detected by the processor, and step A.4 will be repeated in a loop. The request for a different map image may take the form of one of several possibilities. The request could be for the display of a map image that includes a latitude and longitude encompassed by the currently displayed map image and that includes either a larger or a smaller field of view. The request could also be for a map image located adjacently to the north, south, east, or west, or diagonally adjacent to the currently displayed map image. In another example, the request might be for the display of an image encompassing more than one point of specified latitude/longitude. When such a request is made, either through the input device 105 or through a systems command, processing will proceed to steps A.5 and A.6.

In steps A.5 and A.6, the request parameters are tested and verified for correctness, and control is passed to the next step in the process. Under special circumstances, it may be possible to skip some of the steps shown in FIGS. 7(A), 7(B) and 7(C), however, for the purposes of this description it will be assumed that no special circumstances exist, and that all appropriate steps must be carried out.

In step A.7 control is passed to the process described in 7(B). This process tests the current map family data set (FIG. 5) in order to determine whether the request may be satisfied within the current map. If it is possible to satisfy the map image change request within the current map data set, then control returns to step A.3, and the new map image is displayed. If it is not possible to satisfy the request within the current map data set, then additional map data sets must be examined, and step A.8 is executed, in which control is given to the process described in 7(C).

If the process called from step A.8 is able to satisfy the map request, then the new block, scan, and frame information are loaded into the current frame table, and control passes to step A.3, where the new image is displayed and the next map request is awaited. If the process called from step A.8 is not able to satisfy the parameters of the map request, then the original map data set and original current frame table are re-loaded into memory, and control passes to step A.3, where the next map image change request is awaited.

PROCESS 3—FIG. 7(B)

In Step B.1, a test is made to see whether the requested field of view is available within the current map set. If not, control is returned to step A.7, which then passes control to process 7(C). If the requested field of view is available, then the requested latitude and longitude are tested against the current map data set (step B.2). If the latitude/longitude requested are not available on the current map, then control is returned to step A.7, which in turn passes control to process 7(C). Otherwise control passes to step B.3.

In step B.3, a range of blocks is selected from the map data set which is currently in processor memory, this range representing the best choices among the blocks available for satisfying the field of view requested. For example, if a request was made to display an image laterally adjacent to the current image with a field of view equal to the current image, then the range of block representing images with equal fields of view would be chosen for testing. As another example, if the request was for the display of an image having a field of view greater than the current field of view, then only blocks representing images which satisfied that criteria would be chosen for testing.

In step B.4, the selected range of blocks is tested to determine whether the requested latitude and longitude are available within the geographic limits of the range. If the requested latitude/longitude is available, then the most suitable block is selected (step B.7). The block is selected by comparing the requested latitude/longitude with the calculated limits of each block in the range, until a block encompassing the latitude/longitude requested is found.

In step B.8, the most suitable scan ('S') within that block can be calculated as follows:

$$S = 1 + ((DLat - RLat)/ILat$$

where 'DLat' is the desired latitude, 'RLat' is the latitude of the reference point for the block, and 'ILat' is the scan-to-scan increment of latitude. Where appropriate, (due, for example, to overlap considerations), scans adjacent to 'S' are tested to insure that the scan judged as most suitable encompasses the desired latitude at a point nearest to the center of the scan.

In step B.9, the most suitable frame ('F') within the scan may be calculated in a similar manner:

$$F = 1 + ((RLng - DLng)/ILng)$$

where 'DLng' is the desired longitude, 'RLng' is the longitude of the reference point for the scan and 'ILng' is the frame-to-frame increment of longitude. Where appropriate, (due, for example, to overlap considerations), frames adjacent to 'F' are tested to insure that the frame judged as most suitable encompasses the desired latitude at a point nearest to the center of the frame.

With the completion of step B.9, control is returned to step A.7, which loads the current frame table with the new values for block, scan and frame, and returns to step A.3 to display the map image and await the next command.

If the range of blocks tested in step B.4 does not encompass the requested latitude/longitude, then control passes to steps B.5 and B.6. In these steps a new set of blocks is selected from the map data set, if possible, and control returns to step B.4 for testing. If no appropriate set of blocks remains to be tested, then it is judged that the current map does not contain any image that fulfills the map change request, and control returns to step A.7, which notes that no appropriate map portion image exists within the current map, and which passes control to the process described in FIG. 7(C).

PROCESS C—FIG. 7(C)

The process described in FIG. 7(C) is used to choose from the available map images an image that will satisfy the map change request by performing a search of the width index records (FIG. 4). These index records hold data concerning the set of map images generated from an individual map. These index records will be sorted, preferably in ascending order, based on the priority of several sort keys. The highest priority key is be the minimum field of view available among the images, the next highest is the maximum field of view available, followed, in decreasing priority by maximum longitude, minimum latitude, minimum longitude and maximum latitude. By sorting and accessing index records in this manner, no data-file access or examination needs to be made until it is known that a map exists which will fulfill the image request. It will be apparent to those skilled in the art that various other sorting methods may be employed without departing from the scope of the invention, and it is intended that the present invention cover any such methods provided that they come within the scope of the appended claims and their equivalents.

Step C.1 will save the current frame table and the current map data set identification, in case the request cannot be met with any map image available, and the current map image needs to be restored.

Step C.2 sets the search entry position into the width index table based on the type of map change request. All map change requests specify an amount of geographic coverage in some manner; for example, an absolute amount of geographic area that must be displayed ("BOX", etc.), an amount that is some factor of the currently displayed area ("MAP-UP", "MAP-DOWN", etc.) or an amount that is specific, but undetermined and unrelated to the current display width ("DETAIL", "REFERENCE", etc.) By setting an initial width index starting point, the search of the index is positioned at the most advantageous point, and therefore the map image change request may be fulfilled without resorting to inefficient search methods. For example, a map request for "MAP-UP" is a request for the display of an image showing the current locator position and three (or more) times the geographic area shown by the current image. Given that the current field of view is 1.5° longitude, it may be derived that only images with a field of view of at least 4.5° longitude would be acceptable. It is therefore reasonable to position the index such that the first entry examined has a minimum field of view of at least 4.5°, and to search only through the index entries representing maps with larger fields of view.

In step C.3, a direction of index search will be set, based on the type of request; i.e., to search for available map images having larger display widths, for available map images having smaller display widths or, as another example, to search in both directions until a display width closest to the desired display width is found (for example, when a lateral movement is requested such that the desired latitude/longitude position is beyond the boundary of the current map, and an appropriate map image must be found on a new map.) In the example above ("MAP-UP"), the search of index entries would proceed only in the 'upward' direction, i.e., only in the direction of indexes representing map images with larger fields of view.

In step C.4 the previously calculated first index record is accessed and control is passed to steps C.5, and C.6.

Step C.5 determines whether the requested field of view can be satisfied within the display width limits indicated by the index entry, i.e., if the requested field of view is less than the minimum field of view as indicated in the index entry, or the requested field of view is greater than the maximum field of view indicated in the index entry, then the map data set represented by the index entry will not have an image which would fulfill the request, and control is passed to step C.8.

Otherwise, control passes to step C.6, which determines whether the requested Lat/Long is encompassed by the boundaries shown in the width index record. In the same manner as step C.5, the requested latitude is compared against the minimum latitude and maximum latitude fields in the index entry under consideration, and the requested longitude is compared to the minimum longitude and maximum longitude fields in the index. If the requested latitude and longitude are shown by these tests to be encompassed by the map represented by this index, then control passes to step C.7, otherwise control passed to step C.8.

If the data from a display width index item satisfies the tests in steps C.5 and C.6, then the map data set corresponding to that index entry will be retrieved in step C.7 and will be placed into processor memory. Step C.7 will then call upon the process described in FIG. 7(B) to perform testing of the actual map block data, and to select an appropriate block, scan and frame for the new map image (this process (Process B) is exactly as described above, except that any return from the process will be made to the current process—FIG. 7(C)—and not to the processing of FIG. 7(A).)

If the called process (FIG. 7(B)) returns successfully, then a map image has been selected that fulfills the requirements of the map image change request and a return signalling success is made to the calling process, FIG. 7(A), step A.8. The current frame table is then loaded with the appropriate information that relates to the newly selected map image, and control is passed to step A.3, where the new map image is displayed. If, however, the process of FIG. 7(B) returns unsuccessfully, then the next available index record is selected (steps C.8-C.9) for testing.

Step C.8 checks to determine whether another appropriate index record is available. If so, it is made accessable (step C.9) and control is passed to step C.5, where the index testing loop is continued. If no further index records are available, then return is made to the calling process (FIG. 7(A)), where the prior map data set and prior current frame table are restored and control is passed to step A.4 to await the next request.

It will be apparent to those skilled in the art that various modifications and variations can be made to the automated map display system of the present invention without departing from the scope of the invention, and it is intended that the present invention cover the modifications and variations of the system provided that they come within the scope of the appended claims and their equivalents.

What is claimed is:

1. A map display system for electronically storing, accessing, and displaying video images generated from physical maps, the system comprising:

image storing means for storing images of the physical maps, each of said map images having corresponding field of view data representing the geographic coverage in longitude and latitude available as a displayed image derived after generating said map image from the corresponding physical map, a longitude value representing a reference longitude for the map image, and a latitude value representing a reference latitude for the map image;

means for displaying said map images:

means for selecting a latitude, longitude, and field-of-view data of a map image to be displayed, said selecting means including an input device for selectively positioning a locator on said displaying means and means for determining a latitude and longitude location from said position of said locator on said displaying means; and means for accessing from said storing means and for transferring to said displaying means the unique stored map image including said latitude and longitude location and a field of view closest to said desired field of view data.

2. A map display system according to claim 1, wherein said displaying means comprises a cathode ray tube device.

3. A map display system according to claim 1, wherein each of said map images is represented by one or more map portion images, each of said map portion images having associated therewith reference latitude data, reference longitude data, and reference field of view data.

4. A map display system according to claim 3, wherein said input device is able to automatically position said locator on said displaying means in a position accurately corresponding to a selected latitude and longitude regardless of the map image or map portion image being viewed.

5. A map display system according to claim 3, wherein said image storing means comprises an optical storage unit for storing each of said map portion images as corresponding display frame at associated address locations.

6. A map display system according to claim 5, wherein said accessing means includes map data storing means for storing at addressable storage locations a map data record associated with each of the physical maps, each said map data record including said reference latitude data, said reference longitude data, and said reference field of view data associated with each map portion image generated from the same physical map.

7. A map display system according to claim 6, wherein each said map data record further includes map portion detail data for identifying the latitude, longitude, field of view, and address associated with each of said frames of said optical disk storage unit.

8. A map display system according to claim 7, wherein said accessing means further includes map portion index storing means for storing the address of each said map data record and said reference longitude data, reference latitude data, and reference field of view data.

9. A map display system according to claim 8, wherein said map data storing means comprises a microcomputer or other processor having an internal memory and said map portion index storing means comprises a portion of said internal memory.

10. A map display system according to claim 8, wherein said accessing means comprises a central processing unit connected to said input device and said optical storage unit, and wherein said central processing unit includes programmed means for (1) accessing said map portion index storing means in response to said selected latitude, longitude, and field of view, (2) determining said map data record including reference latitude data, reference longitude data, and reference field of view data including said selected latitude, longitude, and field of view, (3) accessing said determined map data record, (4) selecting from said accessed map data record map portion detail data of said accessed map data record said address of said frame in said optical disk storage unit storing a map portion image including said selected latitude, longitude, and a field of view closest to said selected field of view, and (5) controlling said optical disk storage unit to transfer to said displaying means said frame having said selected address for the display thereby.

11. A method for electronically selecting displaying a map portion image of a selected portion of a physical map from a plurality of map portion images where the map portion images are generated from a plurality of physical maps having different fields of view representing the geographic coverages of the maps in longitude and latitude comprising the steps of:

providing a map family file including map data records associated with each of the physical maps, each said map data record including reference latitude data, reference longitude data, and reference field of view data associated with the map portion images generated from the same physical map;

providing an optical disk storage means for storing at addressable storage locations display frames corresponding to the map portion images associated with a map data record, each of the map portion images corresponding to a portion of a physical map and having an associated latitude, longitude, and field of view;

providing in each said map data record map portion detail data identifying the latitude, longitude, field of view, and frame address of each of the map portion images;

positioning a locator on a map portion image displayed on a display device to identify a latitude and longitude location:

selecting a field of view for a map portion images including said latitude and longitude location;

selecting a map data record in response to said identified latitude and longitude location, and said selected field of view;

accessing said selected map data record and selecting from map portion detail data stored in the map data record the address of a frame in the optical disk storage unit storing a map portion that includes the identified latitude and longitude location, and a field of view closest to the selected field of view; and controlling the optical disk storage unit to transfer to the display device to display thereon the frame having the selected address.

12. A map display system for displaying video images generated from a plurality of physical maps, including maps having respective geographic coverages that are discontiguous and non-overlapping with the geographic coverages of the other maps, and wherein the physical maps have different fields of view representing the geographic coverages of the maps in longitude and latitude, the system comprising:

image storing means for storing video map images derived from the physical maps, each of said video map images having corresponding field of view data representing the geographic coverage in longitude and latitude of the video map image, a longitude value representing a reference longitude for the map image, and a latitude value representing a reference latitude for the map image;

means for displaying said video map images;

means for requesting the display of a video map image including a latitude and longitude position included in or adjacent to said video map image being displayed by said displaying means as identified by positioning a locator on said video map image being displayed by said displaying means and a field of view having a designated relationship to the field of view of said video map image being displayed by said displaying means; and means for accessing from said storing means and for transferring to said displaying means the stored video map image including said latitude and longitude position and having a field of view closest to said designated relationship to the field of view of said video map image being displayed by said displaying means.

13. A map display system for displaying a map image of a geographic location having a selected latitude and longitude and being displayed with a selected field of view comprising:

optical disk storage means for storing images of portions of any collection of geographic maps, including geographic maps that are discontiguous, non-overlapping, use different cartographic projections, or have different scales with respect to the remaining maps, each of the images being of a corresponding geographic location having a corresponding latitude, longitude, and field of view;

means for selecting a geographic location with a corresponding latitude and longitude to be displayed with a selected field of view;

means for accessing from said storing means, in response to the selection of said geographic location to be displayed, said stored map portion image having said corresponding latitude and longitude, and the closest field of view to the selected field of view; and means for displaying said accessed map portion image, said selecting means including means for positioning a locator on a map portion image displayed by the displaying means to indicate the latitude and longitude of said geographic location to be displayed.

* * * * *